April 28, 1931. C. ADLER, JR 1,803,290
TRACKLESS HIGHWAY CONTROL SYSTEM FOR AUTOMOBILES
Filed July 31, 1926 4 Sheets-Sheet 1

Inventor
Charles Adler Jr.
By Charles B. Mann Jr.
Attorney

April 28, 1931.  C. ADLER, JR  1,803,290
TRACKLESS HIGHWAY CONTROL SYSTEM FOR AUTOMOBILES
Filed July 31, 1926  4 Sheets-Sheet 2

April 28, 1931. C. ADLER, JR 1,803,290
TRACKLESS HIGHWAY CONTROL SYSTEM FOR AUTOMOBILES
Filed July 31, 1926 4 Sheets-Sheet 4

Inventor
Charles Adler Jr.
By
Charles B. Manny Jr.
Attorney

Patented Apr. 28, 1931

1,803,290

UNITED STATES PATENT OFFICE

CHARLES ADLER, JR., OF BALTIMORE, MARYLAND, ASSIGNOR TO THE ADLER SAFETY CONTROL COMPANY, OF BALTIMORE, MARYLAND, A CORPORATION OF MARYLAND

TRACKLESS-HIGHWAY CONTROL SYSTEM FOR AUTOMOBILES

Application filed July 31, 1926. Serial No. 126,223.

This invention relates to a trackless highway mechanism for controlling the speed of automobiles on highways at dangerous places; through hamlets or villages, at railroad crossings or other places where it is important that automobiles travel at a reduced speed.

The present application is directed to a trackless highway mechanism, which however, is to be utilized in connection with a mechanism carried on the automobile to control the latter.

The automobile mechanism forms the subject of a separate application for patents filed by me July 28th, 1926, Serial Number 125,552 and therefore claims to that mechanism per se are not included herein.

An object of the present invention is to provide on the trackless highway an improved means by which a mechanism carried on the automobile may be actuated when approaching a place of danger, such as a railroad crossing; cross-roads, sharp curves or any place where safety demands a reduction in the speed of the automobile, and by such actuation cut off the power means at speeds above a predetermined low speed and to also provide a second means in the highway at a point where it is deemed safe to resume high speed whereby the mechanism on the automobile will again be actuated to place the power means on the automobile in a condition to be operated at speeds above the said predetermined low speed.

A further object of the invention is to provide a trackless highway mechanism embodying the operations above set forth that shall be entirely automatic.

In carrying out the present invention, I have found that the same is capable of variations in the arrangement of highway installations with respect to the actual point of danger in the highway, particularly with respect to the location of that member of the highway mechanism which I herein term the reset mechanism or element.

The accompanying drawings illustrate the invention in its broader aspect, wherein,—

Figure 1:
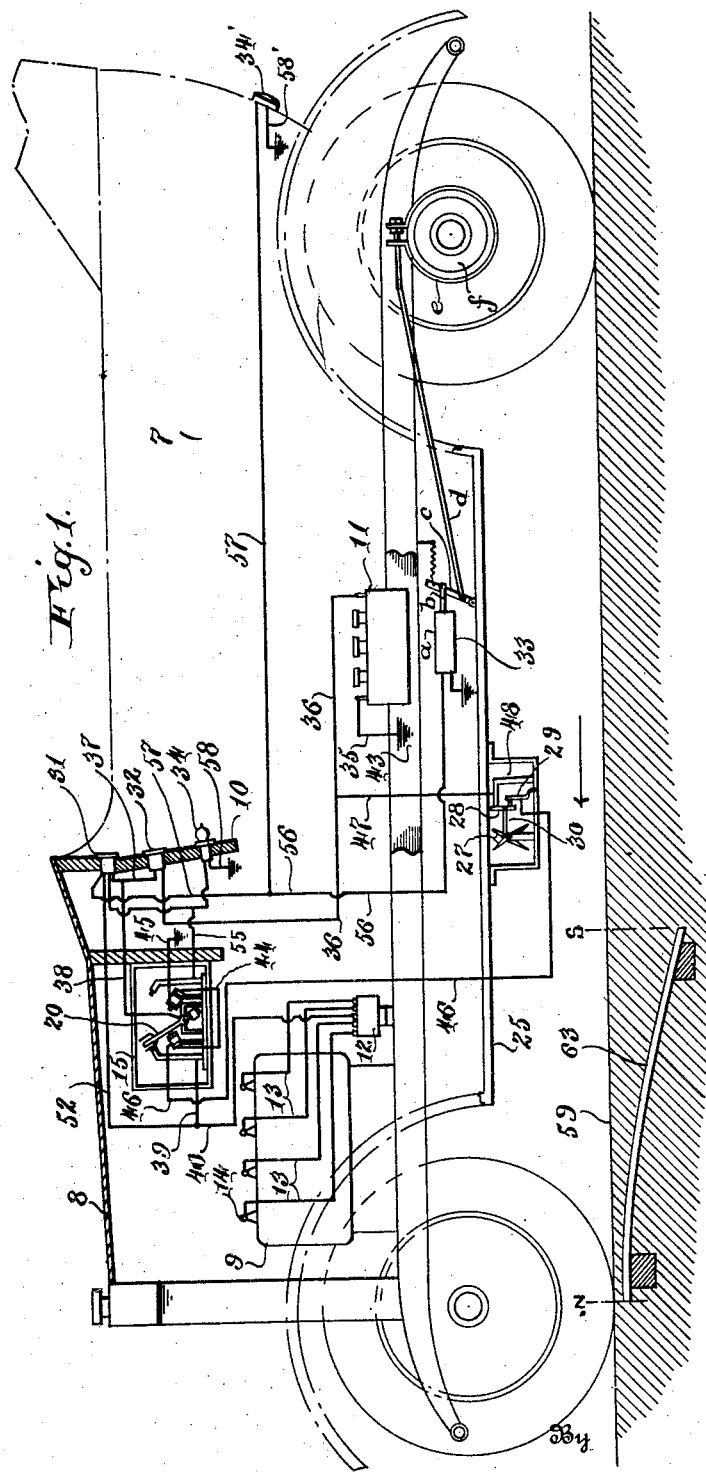

Fig. 1 shows a longitudinal sectional view through the hood portion of an automobile under which the engine is located, with the control means in place on the automobile and also shows a longitudinal section through the highway beneath which one of the highway mechanisms embodying the present invention is located.

Figure 2:
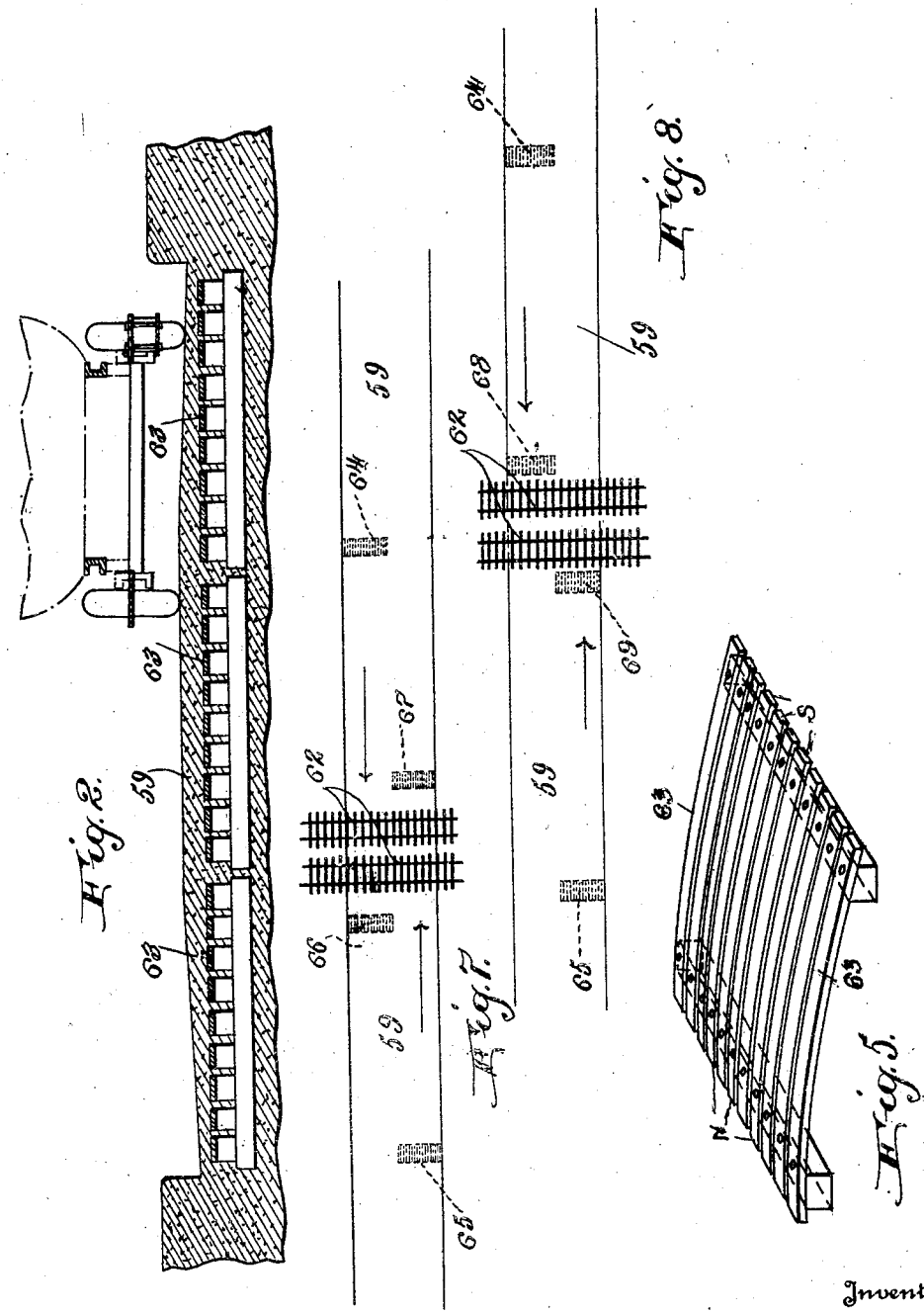

Fig. 2. illustrates a cross-sectional detail through the highway at one of the highway elements and also shows an automobile on the highway.

Figure 3:
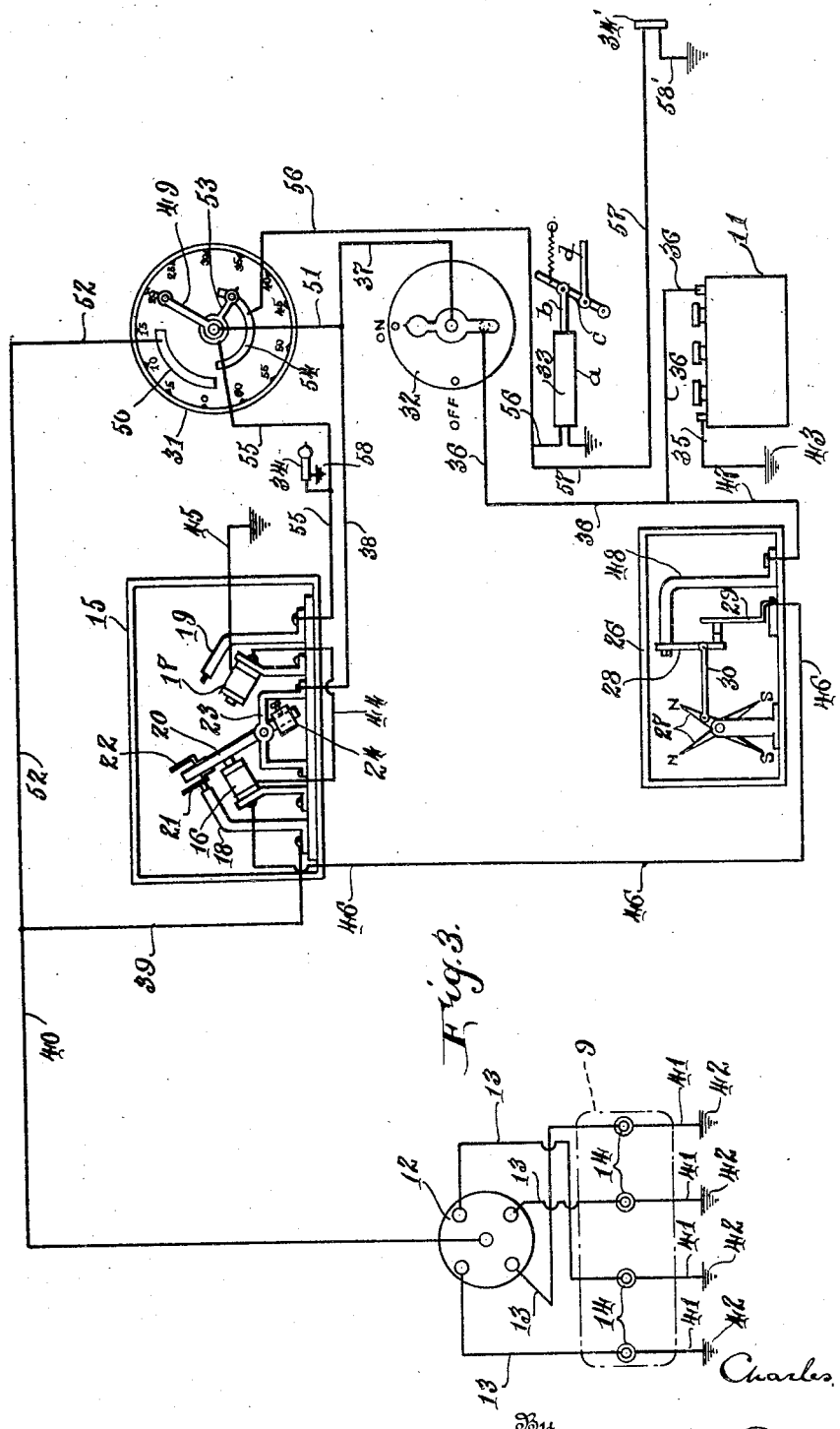

Fig. 3. illustrates, on an enlarged scale, the apparatus and circuits on the automobile said devices and circuits being in the normal condition.

Figure 4:
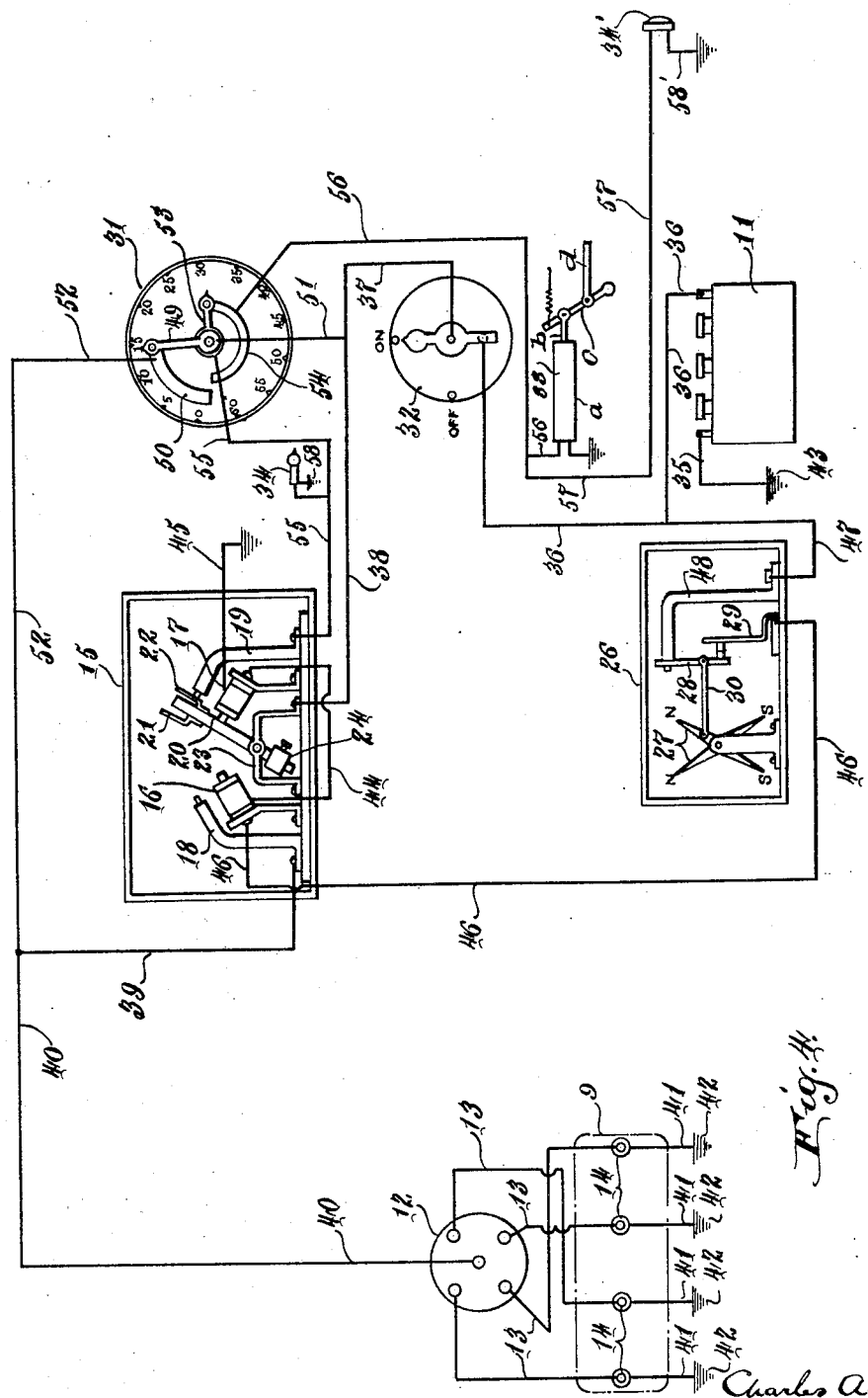

Fig. 4. shows the same but with the parts and circuits in the operative condition to prevent a speed above a predetermined low speed.

Fig. 5 illustrates a unit of one of the highway elements, the same being shown in perspective.

Fig. 6. shows in a diagrammatic manner one arrangement of highway mechanisms with respect to a place of danger on the highway.

Fig. 7. illustrated another arrangement of highway mechanisms with respect to a place of danger on the highway,—the view also being merely diagrammatic, and Fig. 8. shows diagrammatically another arrangement of highway mechanisms with respect to a place of danger on the highway.

To illustrate the present invention so that its operation may be understood, I have shown the improved highway mechanism and a form of mechanism on an automobile,—the latter however being the subject of another application for patent filed by me and not herein specifically claimed.

The automobile mechanism will be first described and the improved highway mechanism will follow.

Referring particularly to Figs. 1 and 3 of the drawing, the numeral 7 designates the body of an automobile; 8 the hood which covers the engine or motor 9, and 10 designates the instrument-board or dash.

The usual battery 11 is employed as is also a distributor 12 having connections 13 with the several spark-plugs 14 of the motor 9.

I prefer to provide a case 15 on the automobile in which certain elements or apparatus may be placed and sealed and in the present disclosure, I show this case beneath the hood 8.

In this case 15, I locate two electro-magnets 16 and 17 respectively, and associated with the magnet 16, I provide a contact-bar 18 while a similar bar 19 is associated with the electro-magnet 17.

Between the two electro-magnets 16 and 17, I locate a pendulum-like bar 20 on which there are side contacts 21 and 22 respectively, which contacts are so located that when the pendulum-bar is tilted in one position, the contact 21 will engage contact-bar 18 and when said pendulum-bar is swung to its other position, the contact 22 of said bar 20 will engage the contact-bar 19.

The pendulum-bar 20 in this instance is mounted in a bearing bracket 23 between its two ends and the lower end of this bar 20 is preferably provided with an adjusting weight 24, in order that it may be properly balanced to enable it to swing by gravity from the core of one electro-magnet to the core of the other electro-magnet between which magnets said bar will be moved.

In addition to the selective relay which includes the pendulum-bar and the two electro-magnets 16—17 which control it, I make use of an impulse breaker element which I also carry on the automobile and which is actuated by the independent highway elements as each of the latter is passed.

This breaker element may be attached to the automobile at any convenient place such as at the inner side of one of the front wheels or beneath the running board 25.

I prefer to make this attachment to something that is sustained by the springs, such as the body and things carried thereby, because such attachment relieves the breaker element of undue shocks and needless vibrations which it would receive if carried by the axles for example.

In this instance, I therefore show the breaker-device mounted in a case 26 which is carried beneath the running-board 25 and by reference to Figs. 1–3 and 4 of the drawings, it will be seen that this breaker-device in the present instance, includes a pivotally-sustained magnetic needle-bar device 27 and two contact-plates 28 and 29,—the needle-bar device 27 being connected by a link 30 with one of the contact plates so that when the needle-bar is momentarily oscillated, it will instantly separate the contact-plates 28 and 29.

In addition to the selective relay, which includes the electro-magnets 16—17 and the pendulum-bar 20, and the devices 27—28—29 of the impulse breaker element, I also use a speed governor 31; an ignition switch 32, and in some instances a brake mechanism 33 and a signal lamp 34 all of which are diagrammatically illustrated in Figs. 1–3 and 4 of the drawings.

The brake mechanism in this instance is shown diagrammatically as a solenoid, $a$, having a plunger-rod, $b$, which connects with a lever $c$, and a brake rod $d$, having one end attached to lever $c$ while its other end is connected to the brake bands $e$, around the brake-drum $f$.

Having described the mechanical structures of the elements involved, I will now proceed to explain the circuits for effecting an operation of those elements on the vehicle.

As is common practice in automobile wiring installations, the battery 11, has one side or terminal grounded to the automobile frame, as for example by a wire 35.

From the other post or terminal, I run a wire 36 to the ordinary ignition-switch 32, which is usually carried on the dash or instrument-board 10.

From the ignition-switch 32, there are wires 37—38 that lead to and connect the bracket bearing 23, which carries the pendulum-bar 20 so that the pendulum-bar will be included in any circuit that includes the wire 38.

When the pendulum-bar 20 is attracted by the electro-magnet 16, as shown in Fig. 3, its contact-plate 21, will engage contact bar 18 and from the bar 18 there extend wires 39 and 40 which latter wire connections, in this instance, connect with the distributer 12 of the motor.

It will thus be understood that the battery 11, will have a connection through the ignition switch 32, pendulum-bar 20, contact-bar 18, to the distributor 12 as long as the pendulum-bar is held by magnet 16, as shown in the normal circuit condition in Fig. 3, so that the ordinary operations of the ignition circuit may be carried on between the battery and the spark-plugs 14 of the motor 9.

Thus, under the conditions illustrated in Fig. 3, the automobile may be driven at any desired speed.

The return circuit from the motor 9 to the battery 11 is indicated by the wire 41, the grounds 42 and 43 and the ground wire 35 back to the battery.

It will be noted that the coils of the two magnets 16—17 are connected by wire 44; that magnet 17 has a ground connection 45 and that from magnet 16 there is a wire 46 that leads to and connects with the contact plate 29 of the breaker device.

Another wire 47 connects the main battery wire 36, with the bracket 48 that carries the contact plate 28, which the magnetic needle-bar device 27, momentarily actuates each time a highway device is passed.

It has been pointed out that as long as electro-magnet 16 is energized with the pendulum-bar 20 attracted thereto the main ignition circuit from battery 11 to the distributer 12, and spark plugs 14 will be closed between the contact plate 21 and contact-bar 18. The energization of electro-magnet 16, however is controlled through the breaker device,—the circuit being from battery 11, by wires 36—47 to and through bracket 48 and contact-plate 28 to plate 29; then by wire 46 to and through the coil of magnet 16; then by wire 44 to and through the coil of the other electro-magnet 17 and finally by wire 45 to ground and back to the battery.

It will thus be seen both electro-magnets 16—17 are energized, in the form of apparatus herein disclosed, as long as contact-plates 28—29 are engaged but immediately upon the opening of those plates the circuit from the battery through those magnets will be opened and pendulum-bar 20 will be released so its upper end will swing over toward the core of electro-magnet 17.

The opening of this circuit is but for the instant consumed by the automobile passing the improved highway element after which the circuit is again closed because electro-magnets are deenergized for a lesser period than is consumed by the pendulum-bar 20 swinging away from the magnet 16 toward the magnet 17, consequently as the bar 20 approaches the core of magnet 17, the latter will have again become energized so as to attract and hold the bar 20 with contact 22 engaging contact-bar 19 and the apparatus will then be in the position illustrated in Fig. 4 of the drawings.

By referring to Fig. 4, it will be noted that the normal ignition circuit from battery 11 to distributer 12, is interrupted, because contact-bar 18 and the contact plate 21 on the pendulum-bar 20 are separated, consequently firing in the cylinders of the motor will stop unless a substitute ignition circuit be provided while the pendulum-bar 20 is held by magnet 17.

A substitute ignition circuit, however, cannot be formed until the speed of the automobile is reduced to a predetermined low speed, consequently, in this instance, there can be no further firing of the charge in any of the motor-cylinders until the speed is reduced to that predetermined speed.

The reason for this is, that the substitute ignition circuit can only be formed through the speed governor 31, but it can only be formed through this speed governor after the speed has been reduced to the predetermined lower speed, at which low speed the governor will act as a switch to close the substitute ignition-circuit.

By again referring to Figs. 3 and 4 of the drawings, it will be noted that the speed switch or governor 31, has a movable contact element 49 and a stationary contact element 50,—the movable element traveling in a direction away from the stationary element 50 as the speed is increased beyond the predetermined low speed point, but moving back toward the stationary element 50 as the speed is decreased.

When the speed is at or below the maximum low speed point,—say from fifteen miles per hour to zero, then the movable contact 49 will engage the stationary contact 50 and by such engagement, close the low speed ignition circuit.

To accomplish this, I provide a wire 51 from the wire 37 to the movable contact 49, and I provide another wire 52 from the stationary contact to the wire 40 that leads to the distributer 12, consequently as long as the speed is in excess or above the predetermined low speed the movable contact 49 will be disengaged from the stationary contact 50 as in Fig. 2, and a substitute ignition circuit to the motor cannot be formed as long as pendulum-bar 20 is closed with contact bar 19, consequently the firing at the motor stops until the speed is cut down.

When, however, the speed has been reduced to the predetermined low speed, the movable contact 49 will engage the stationary contact 50, and immediately this engagement takes place, the substitute circuit will be formed and firing at the cylinders will take place, but only so long as the low speed is maintained.

Instead of depending on the motor as the means for controlling the automobile and its speed, I prefer to provide some means that will reduce the speed such as an application of the brakes on the automobile.

To this end, I show the speed governor 31 having a second movable contact 53, and a second stationary contact 54. These two contacts 53 and 54 are electrically separated from the two contacts 49 and 50 hereinbefore referred to, but the movable contact 53 is so positioned and mounted that it will move as contact 49 moves and will engage the stationary contact 54 at all speeds over the predetermined low speed but will disengage said stationary contact 54 during all speeds under the predetermined low speed.

These two contacts 53 and 54 may be termed high speed contacts to distinguish them readily from the two low speed contacts 49—50.

From the high-speed contact 53, I provide a wire connection 55 to the contact-bar 19 of the selective relay and from the high speed contact 54, I provide another wire 56 which connects with the solenoid $a$, of the brake mechanism.

All of these connections 53—54—55—56—57 and 58, may be regarded as back-contacts for the pendulum-bar 20, for when that bar is released by magnet 16, when approaching a danger zone, it is swung over to and held by magnet 17, while the automobile is passing through that danger zone and if the speed upon entering that zone is above the predetermined low speed, the moment pendulum-bar 20 swings over to magnet 19, a circuit is formed which actuates the solenoid, a, and applies the brakes until the speed is reduced to the predetermined speed whereupon the solenoid circuit will be interrupted and the substitute ignition circuit formed through the low speed contacts 49—50 to the motor.

The solenoid circuit at speeds above the low speed in a danger zone will be as follows:

From battery 11, by wires 36 to and through ignition switch 32, then by wires 37—38 to bearing-bracket 23 and through pendulum-bar 20 to back contact-bar 19, then by wire 55 to dash lamp 34 and ground 58 and also to movable high-speed contact 53, then through high-speed stationary contact 54 to and through wire 56 to the solenoid, which will operate the brake and from the wire 56, by wire 57 to lamp 34¹ and wire 58¹ to ground and back to battery.

Thus at high speed when entering a danger zone, the solenoid circuit will be formed and the brakes applied to control the automobile until the speed is reduced to a predetermined low speed, whereupon the brakes will be released and the substitute low speed ignition circuit will be formed while the automobile is traveling through said danger zone.

In accordance with the present invention, I provide stationary highway elements in the trackless highway to effect an operation of the means carried on the automobile, 1st, to prevent the automobile from being driven above a predetermined speed upon entering a danger zone and 2nd, to reset the means on the automobile when it is deemed safe to permit the speed to be increased.

The highway elements are entirely separate and independent of each other in that they have neither mechanical nor electrical connection one with another and each highway element is preferably at all times in an operative or energized condition.

The structure is entirely automatic in that it is actuated to reduce speed and then reset to permit unlimited speed without calling upon the driver of the automobile to manually cooperate, so that continuous control throughout dangerous zones along the trackless highway is automatically provided.

Attention is now directed to Figs. 1–6–7 and 8 of the drawings in order that an explanation of the improved highway elements may be set forth.

At or beneath the surface of the highway 59, I locate a magnet. I have learned that these magnets may be installed in various ways in the highway, but in the present instance and as shown in Fig. 6, I have located the magnets 60 and 61 presumably on opposite sides of a railway crossing 62 which intersects the highway.

These highway magnets, in this instance, are presumed to be permanent magnets with the north poles of the magnet bars 63 all located at one end and the south poles all located at the opposite end of the magnet structure.

I prefer to arrange these magnet bars 63, with one end lower than the other with respect to the highway surface although this is not actually necessary.

It is to be understood that these separate and individual bars are parallel and each bar extends in a direction lengthwise of the highway 59 and it is also to be understood that in the case of permanent magnets, there is absolutely no mechanical or electrical connection between the set of magnet-bars 60 on one side of the intersecting rod 62 and the set of magnet bars 61 on the other side of the said intersecting road.

It is also to be understood that instead of being an intersection between a highway and a railroad, the magnets 60—61 may be located at the entrance and exits of a village or hamlet, or at dangerous curves or cross roads.

Presuming an automobile to be traveling from left to right on the highway 59 in Fig. 6, immediately upon passing over magnet 60, the north poles or higher ends of the magnet bars will attract the south pole ends of the magnetic needle-bar 27 of the breaker device, and thus oscillate the needle-bars, open contacts 28—29 and momentarily deenergize electro-magnets 16—17 on the automobile.

This operation releases pendulum-bar 20 from magnet 16 and opens the normal ignition circuit at 18—21. The pendulum-bar then swings over toward magnet 17, and while making this movement the magnets become energized again as soon as contacts 28—29 on the breaker close. Consequently, when pendulum-bar 20 approaches the energized magnet 17, the latter attracts and holds it, thereby closing the contact 22 with the bar 19, in readiness to complete a substitute ignition circuit as soon as the speed is reduced, or if the speed has been reduced, because of roadway warning signs, the substitute circuit will immediately be formed through the speed switch contacts 49—50.

If the speed has not been reduced however, the solenoid will be operated and the brakes applied until the speed is reduced and then the solenoid circuit will be interrupted through the opening of high-speed contacts 53 and 54.

The low speed ignition circuit will be maintained until the normal ignition circuit is restored.

The restoration of the normal ignition circuit is effected when the automobile passes over the reset magnet 61 because when this occurs the magnetic needle device 27, will again be actuated,—the electro-magnets 16—17 will again be momentarily deenergized and the pendulum-bar 20 will swing back and be held by electro-magnet 16 so as to automatically restore the normal ignition circuit and permit the automobile to be operated at high or low speed without hinderance.

It will thus be seen that the operation is entirely automatic both as to setting and resetting of the apparatus.

It will further be noted that immediately the ignition circuit is interrupted and the pendulum bar 20 swings over to contact bar 19, the dash lamp 34 is ignited and the operator at once notified that his ignition has been cut off because of high speed at a dangerous place.

I have found it expedient to provide an installation of magnet units in the trackless highway so that immediately upon passing a place of danger, the mechanism on the automobile may be at once reset so as to permit the speeding up of traffic immediately the danger point has been passed.

This form of highway installation is illustrated in Fig. 7 of the drawing wherein the trackless highway is designated 59 and the cross-road or railway crossing is indicated by the numeral 62. In this form of trackless highway installation, I provide a magnet-unit 64 at one end of the danger zone for traffic in a direction from right to left and I provide a similar magnet-unit 65, at the other approach to the danger zone for traffic in a direction from left to right.

It is to be noted that these two magnet-units 64 and 65 extend part of the way only across the trackless highway and in practice two-thirds of the way, more or less will be sufficient, because the magnetic breaker device on the automobile is carried on the right hand side of the latter, as indicated in Fig. 2 of the drawing so that the driver of the automobile cannot, by driving on the left side of the highway pass around the end of the magnets 64 or 65 without operating the said breaker-device.

By again referring to Fig. 7, it will be noted that the reset magnet unit 66 for traffic in a direction from right to left, is located in the highway immediately beyond the railway or other crossing 52, so that immediately upon passing the actual point of danger, the magnet-unit 66 will at once reset the mechanism on the automobile so the latter may be speeded up.

In like manner, the reset magnet-unit 67, for traffic in a direction from left to right will be, in this instance located on the far side of but adjacent to the actual point of danger, so that immediately upon passing the actual point of danger in a direction from left to right the magnet unit 67 will reset the mechanism on the automobile and enable the latter to be driven at any desired speed above the predetermined low speed.

In some instances, it may be desirable to give the driver of the automobile full control of the speed of his car while passing the actual point of danger so that in case of an emergency arising, the driver may by use of the full power and speed of his car avoid an acccident.

This may be accomplished as indicated in Fig. 8 of the drawings wherein the trackless highway is designated 59; the cross-road, railway crossing, dangerous curve is designated 62, while the magnet units 64 and 65 guarding the entrance ends to the danger zone are arranged precisely as described in connection with the lay-out shown in Fig. 7.

In this form (Fig. 8) however, I have shown the reset magnet-unit 68, for traffic in a direction from right to left, located at the approach side to the actual danger point 62, so that just before crossing the danger point 62, the reset magnet 68 will reset the mechanism on the automobile and restore the same so that complete speed control will be turned over to the driver as the automobile is about to cross or pass the actual danger point.

For traffic in a direction from left to right, in the arrangement of Fig. 8, I provide the reset magnet-unit 69.

It will thus be understood that in all of the forms of highway installations of magnet-units there is one of such units to set the mechanism on the automobile and another of such units to reset that mechanism so that upon approaching a point of danger the mechanism on the automobile will be set against high speed and may be reset at any desired point.

From the foregoing explanation of the highway mechanisms or magnet-units, it is to be understood that the danger zones on the trackless highway are fixed zones of danger in that they are always dangerous for high speed traffic, and that the danger in the highway at one place has nothing whatever to do with a dangerous portion of the highway at some other place.

Neither has a highway magnet-unit installation at one fixed zone of danger any connection, either mechanically or electrically, with a magnet unit installation at some other fixed zone of danger.

It is also to be understood that when the magnet-unit guarding the approach to one fixed zone of danger operates the magnetically-actuated means on the automobile, the motor of the automobile cannot be driven by its power above the predetermined low speed limit because when the automobile attains a speed above the fixed low speed limit, the power of the motor is cut off so that the motor cannot be driven by power above the low speed limit until its control means has been reset.

Having described my invention, I claim,—

1. A system for controlling the speed of automobiles the combination with a trackless highway having fixed zones of danger for automobiles traveling at high speed, of constantly-energized magnets fixed to the highway at opposite approaches to the said fixed zones of danger for traffic in opposite directions said energized magnets being distributed so as to extend in a direction crosswise of the highway whereby an automobile entering a danger zone must pass over said magnets, other constantly energized magnets also fixed to the highway at a point between the magnets at the opposite entrances to said danger zone, a speed control means on the automobile, means also on the automobile to actuate the speed means said actuating means being operable by the magnets at the entrance to a danger zone to limit the speed of the automobile, and said actuating means also being operable by said other magnets to restore the speed control means after it has been operated at the entrance to a zone.

2. A magnet structure for use along trackless highways to control the speed of automobiles thereover said magnet structure consisting of a series of spaced parallel magnetized bars each with a north pole end and a south pole end,—said bars being laid side-by-side with all the north pole ends at the same side of the structure and the south pole ends at the opposite side of the structure whereby a vehicle may pass over the bars in a direction from one pole end to the opposite pole end thereof.

3. A permanent magnet structure for use along trackless highways to control the speed of automobiles which latter have a speed control means that may be actuated upon passing over said magnet structure,—said structure consisting of a series of spaced parallel magnetized bars each having a north pole end and a south pole end said series of bars being laid so they will extend lengthwise of the highway with their north pole ends facing in one direction of the highway and their south pole ends facing in a reverse direction of the highway the bars being also laid side-by-side in a direction crosswise of the highway so that automobiles will pass thereover in a direction from one pole end to the opposite pole end thereof.

4. In a trackless highway system for controlling automobiles wherein the automobiles have a mechanism thereon which includes a magnetically-operable control device which when actuated at one time will cause the control means to function and when operated the next time will stop the functioning of the control means, the combination with a permanent highway magnet structure at a place on the highway where there is a fixed and permanent zone of danger said highway means consisting of a permanent magnet at the entrance to the danger zone and at the approach side of the actual point of danger for traffic in one direction, of another and separate permanent magnet at the entrance to said zone on the other approach side of the actual point of danger for traffic in a reverse direction said permanent magnets at the opposite entrances to said danger zone actuating the control devices on each automobile entering said zone, and permanent magnet-means in said zone and on the trackless highway between the opposite entrances to said zone for again operating the said control means on the automobile to stop the functioning of the means on the automobile and restore the mechanism thereon to normal.

In testimony whereof I affix my signature.

CHARLES ADLER, Jr.